United States Patent [19]

Rosenbluth et al.

[11] 4,317,043
[45] Feb. 23, 1982

[54] NORMAL INCIDENCE X-RAY REFLECTORS AND RESONANT CAVITIES FOR SUPPORTING LASER ACTION USING THE SAME

[75] Inventors: Alan E. Rosenbluth, Rochester; James M. Forsyth, Pittsford, both of N.Y.

[73] Assignee: The University of Rochester, Rochester, N.Y.

[21] Appl. No.: 88,699

[22] Filed: Oct. 26, 1979

[51] Int. Cl.³ .............................................. H05G 1/02
[52] U.S. Cl. ....................................... 250/510; 372/99
[58] Field of Search ............................... 250/503, 510; 331/94:5 C, 94.5 H

[56] References Cited

U.S. PATENT DOCUMENTS 3,518,427 6/1970 Cotterill ............................... 250/503
4,205,329 5/1980 Dingle et al. .................... 331/94.5 H

*Primary Examiner*—William L. Sikes
*Attorney, Agent, or Firm*—Martin LuKacher

[57] ABSTRACT

Mirror structures are described which provide high normal incidence reflectivities at x-ray wavelengths (such as soft x-ray wavelengths in the range 70 Å to 300 Å) where conventional metallic reflectors can not function. The mirror is made up of an array of repeated periods each consisting of monoatomic metallic layers and Langmuir-Blodgett hydrocarbon molecular layers. The mirror may also include additional Langmuir-Blodgett bilayers serving as spacer layers and/or additional reflection-enhancing metal films. The various layers are systematically deposited in such a way that, first, the mirror structures are periodic, and second, that the average separation between metallic layers maximizes the reflectance at the design wavelength. Such mirror structures can be configured to define a resonant cavity to support x-ray laser action.

17 Claims, 7 Drawing Figures

NORMAL INCIDENCE X-RAY REFLECTORS AND RESONANT CAVITIES FOR SUPPORTING LASER ACTION USING THE SAME

The Government has rights in this invention pursuant to Grant No. AFOSR-77-3189 awarded by the Dept. of the Air Force.

DESCRIPTION

The present invention relates to x-ray reflectors which can provide high reflectivity at normal incidence and in particular to improved x-ray reflectors utilizing Langmuir-Blodgett layers.

The invention is especially suitable for reflecting wavelengths shorter than 300 A where ordinary solid materials have low reflectance except in grazing incidence (see for example Mallozzi, et al, U.S. Pat. No. 4,143,275 issued Mar. 6, 1979, and Netherlands Pat. No. 145107 issued to Matsushita Electric. Ind. Co. ) and may also be suitable for providing x-ray lasers as well as in other applications where normal incidence x-ray reflecting optics may be of use, such as in x-ray microscopy, astronomy and lithography.

Langmuir-Blodgett monolayers may be built up into multiple film structures; these are periodic repetitions of fatty acid bilayers with separating monoatomic layers of a bivalent metal such as lead. Such a multilayer structure is shown in FIG. 1. The multilayer is formed by first floating a monomolecular fatty acid film on a heavy metal ion solution, and then attaching successive portions of the film to a substrate, such as metal or glass, by dipping the substrate into the solution. A fatty acid layer is deposited during each down stroke and sometimes during each up stroke. Methods for fabricating Langmuir-Blodgett multilayers are described in an article by Katherine B. Blodgett, entitled *Films Built By Depositing Successive Monomolecular Layers On A Solid Surface*, Journal of the American Chemical Society, 57, 1935, page 1007. Further description of these multilayers and the various stearates, palmitates, and other hydrocarbon materials from which the multilayers are made is also found in the text "Insoluble Monolayers At Liquid Gas Interfaces", by G. L. Gaines, Jr., Interscience, 1966 (particularly see pages 336 to 346). The manufacture of Langmuir-Blodgett multilayers which may be used in providing reflectors in accordance with the invention is of the type described in the foregoing literature and also in B. L. Henke, et al., J. Appl. Phys., 49, Feb. 2, 1978 (see also *Advances in X-ray Analysis*, Vol. 18, pages 87 to 105, published by Plenum Press, 1975).

As shown in FIG. 2, Langmuir-Blodgett films have different thicknesses depending, in the case of fatty acid metallic salts having structures of the form $(CH_3(CH_2)_n COO)_2 Pb$, on the number of $CH_2$ groups in the molecular chain. Structures such as shown in FIG. 1 provide reflection only in a narrow band around a central x-ray wavelength determined by the chain length of the molecule used.

Different fatty acids may be used in fabricating different multilayers, but such multilayers as a group can only provide high normal incidence reflectivity in a discrete set of narrow spectral bands corresponding to the discrete set of fatty acid molecular chain lengths available.

Other techniques, such as ones using continuously deposited films of metals, carbon and the like, have been proposed for making multilayer x-ray mirrors. See Haelbich, et al., Appl. Phys. Lett. 34 (3), Feb. 1, 1979, 184, and also Underwood, et al, "Layered Synthetic Microstructures: Properties and Applications in X-ray Astronomy", presented at the SPIE Imaging X-ray Optics Workshop, May 23, 1979.

Another drawback of Langmuir-Blodgett multilayer mirrors is the low concentration of heavy ions in the metallic salts of the fatty acids used to form them; these ions are those from which the monoatomic metallic layers in the mirrors are formed. The metallic layers are only of monoatomic thickness, and so conventional Langmuir-Blodgett multilayers must contain a large number of periods in order to interact strongly with the x-rays, causing an accompanying high level of absorption and resulting in low reflectivity.

It has been discovered in accordance with the invention that normal incidence x-ray reflectors can be fabricated with the Langmuir-Blodgett technique that are not restricted to operation in one of a discrete set of narrow x-ray bands; they can instead be made to efficiently reflect any desired wavelength, for example in the 70 Å to 300 Å spectral range. Accordingly, a mirror may be made in accordance with the invention whose reflectivity is not restricted to one of the discrete set of wavelength bands dictated by the available species of fatty acids, or other hydrocarbon molecules.

In accordance with the invention, such a mirror is made by depositing on a substrate, hydrocarbon Langmuir-Blodgett bilayers made from at least two different molecular species, along with their separating metallic layers. The layers are systematically deposited in a way that makes the mirror structure periodic, and that achieves an appropriate average spacing between the metallic layers. It has been discovered that the effective period thickness or Bragg spacing of the structure is approximately the arithmetic mean of all the spacing distances between central planes of adjacent metallic layers. Increased spacing can be obtained by including Langmuir-Blodgett bilayers not containing monoatomic metallic layers, e.g., made up only of fatty acid molecules having the original carboxyl (COOH) end groups. The spacing distances can also be adjusted by changing the thickness of the metallic layers, as by depositing additional metal on each of the monoatomic metallic layers provided by the Langmuir-Blodgett process. Reflectors with such layers of metallic film have the additional advantage of increasing the interaction of each individual period with the x-rays, allowing the use of fewer periods in the mirror structure. Fewer hydrocarbon molecular Langmuir-Blodgett layers are then required, thus reducing absorption of the x-rays and increasing reflectivity above that obtainable with a conventional Langmuir-Blodgett multilayer. The metallic layers should not be made of so large a thickness that absorption in the metallic layers is excessive.

It is a feature of this invention to provide resonant cavities using reflectors reflective at a wavelength corresponding to a transition exhibiting a population inversion, as between levels of ions in a plasma. The plasma may be produced by a laser beam incident on a target as described in Bhagavantula et al, Optics Communications, 24 (3) March 1978, 331. The x-ray reflectors are normal to an axis of and define a cavity resonant at the x-ray transition wavelength. The x-ray wavelengths can then be amplified and emitted as an x-ray laser beam from the cavity.

It is an object of the present invention to provide improved x-ray reflectors.

It is another object of the present invention to provide improved x-ray reflectors operable at normal incidence and at wavelengths which may be selected by design.

It is a still further object of the invention to provide improved reflectors containing Langmuir-Blodgett layers which achieve higher reflectivity of x-rays having normal incidence thereon than Langmuir-Blodgett multilayers of the prior art.

It is a still further object of the present invention to provide an improved resonator operative at x-ray wavelengths as amplified in a laser produced plasma.

The foregoing and other objects, features and advantages of the invention as well as presently preferred embodiments thereof will be more apparent from a reading of the following description in connection with the accompanying drawings in which.

Figure 1:
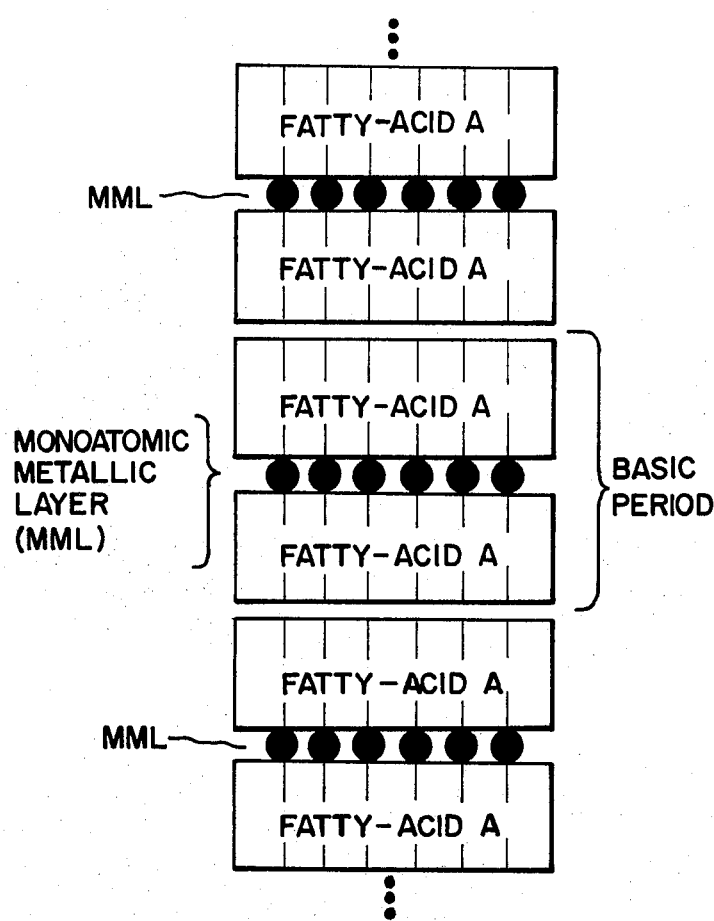
FIG. 1 is a schematic diagram illustrating Langmuir-Blodgett multilayers of the prior art.
Figure 2:
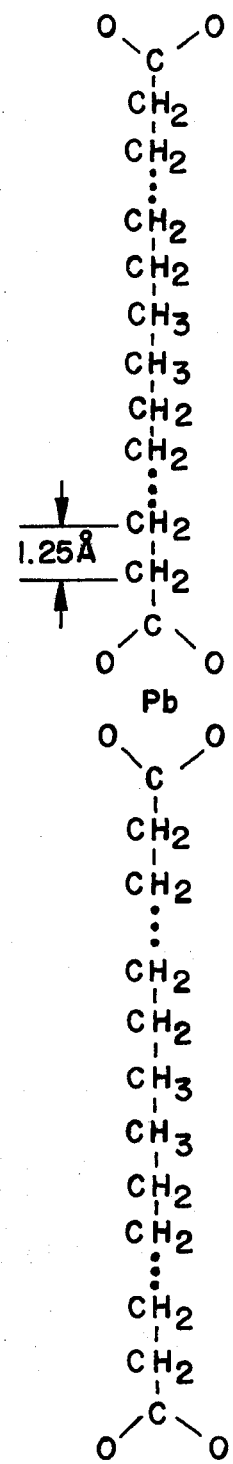
FIG. 2 is a molecular diagram showing the basic period of the Langmuir-Blodgett multilayer shown in FIG. 1.

Referring again to FIGS. 1 and 2 it will be appreciated that each of the blocks in the Figures, like those labeled "Fatty Acid A", represents a molecular chain of one type of fatty acid. Each of these fatty acid chains is headed by atoms of the monoatomic metallic layer. FIG. 2 shows these atoms as being lead. Thus two chains of the fatty acid molecule and a metal atom constitute the length of the basic period of the film. This length is measured in the direction of the thickness of the film. For a particular fatty acid species there are a particular number of $CH_2$ groups; in naturally occurring fatty acids this is an even number. The length of a period is approximately equal to twice the length of each molecular chain added to the relatively small length of the COOPbOOC groups between the chains. The distance between each $CH_2$ group is approximately 1.25 Å. Accordingly, the different fatty acids provide periods of different thicknesses differing by 2.5 Å from one another. (The set of naturally occuring fatty acids provides periods whose thicknesses change in steps of 5 Å.) Inasmuch as a period has thickness roughly equal to half the wavelength of the normally incident radiation, a multilayer consisting of repeated identical Langmuir-Blodgett bilayers is reflective of normally incident radiation in one of a set of narrow bands surrounding a discrete set of wavelengths that are separated by 5 Å from one another (or 10 Å if only naturally occurring fatty-acids are used).

It is desirable and necessary in many applications that normal incident x-ray mirrors be reflective at a wavelength which is selectible by design.

Figures 3, 4:
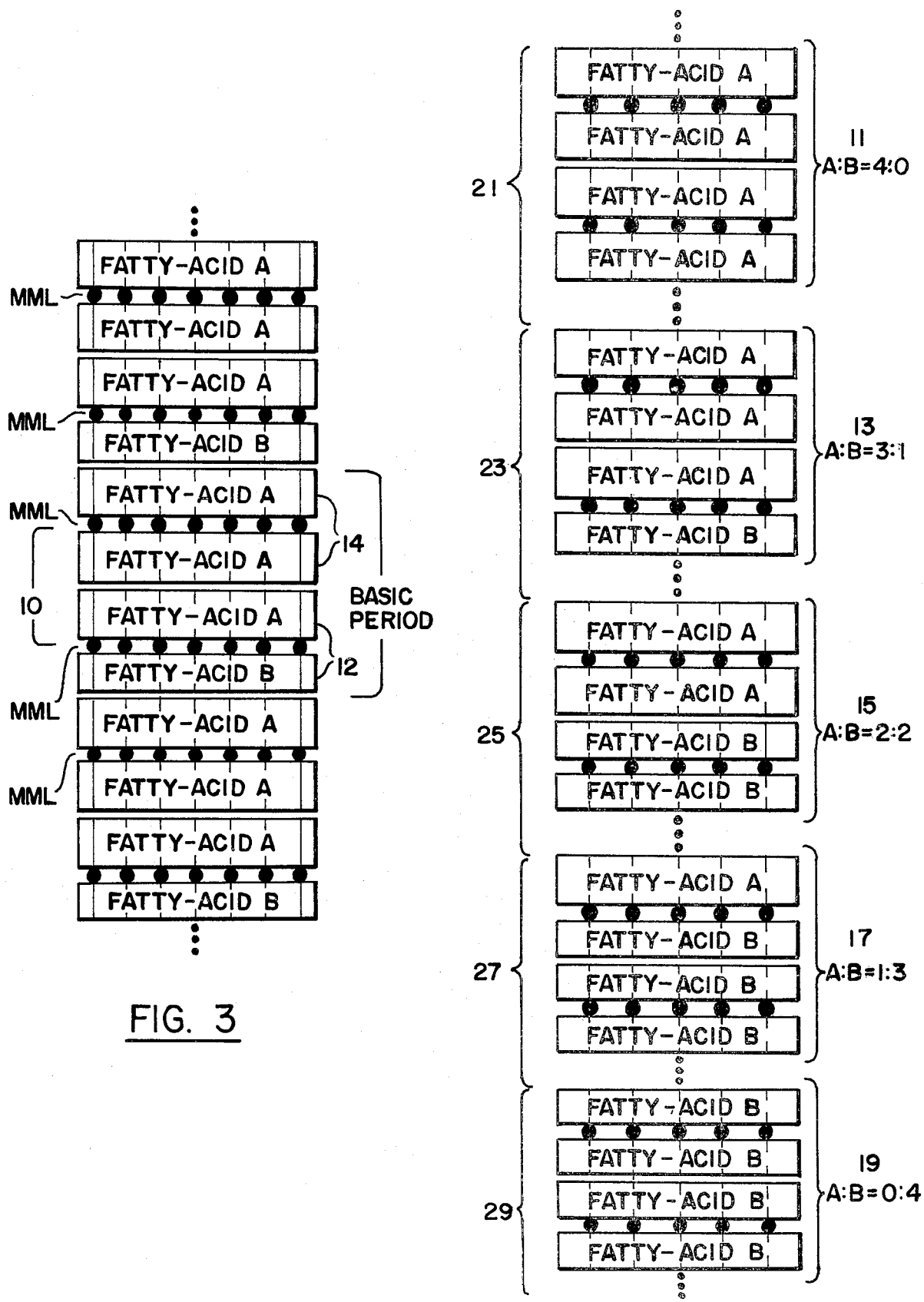
FIG. 3 is a schematic diagram of a high reflectance normal incidence mirror which may be designed to reflect any selected soft x-ray wavelength and which is provided in accordance with a first embodiment of the invention.
FIG. 4 is a schematic diagram of a reflector formed from multiple layers but with periods of different lengths so as to provide reflectance over a range of x-ray wavelengths.

Referring to FIG. 3 there is shown a portion of an x-ray reflector in which the wavelength of peak normal incidence reflectivity has been shifted away from any of the discrete values that a multilayer made from repeated periods of a single fatty acid species is restricted to. In particular, the multilayer shown in FIG. 3 may be designed to reflect a wavelength not among those in the discrete set of narrow spectral bands to which multilayers shown in FIGS. 1 and 2 are restricted in their normal incidence operation.

Each period of the multilayer of FIG. 3 is made up of multiple Langmuir-Blodgett layers. A monoatomic metallic layer (MML) of a bivalent material such as lead is attached to and sandwiched between pairs of hydrocarbon molecular Langmuir-Blodgett layers. One of these pairs 14 has hydrocarbon molecular Langmuir-Blodgett layers of like chain length having been made from a single species of fatty acid, indicated as Fatty Acid A. The other of these monolayer pairs 12 contains one hydrocarbon Langmuir-Blodgett layer of the same fatty acid species and of the same chain length as the layers in the first monolayer pair 14, but has another hydrocarbon Langmuir-Blodgett layer of a second species of fatty acid, indicated as Fatty Acid B. This other species is illustrated as being of a chain length smaller than the chain length of the molecules of Fatty Acid A. The physical repeat period of the multilayer is thus of mixed spacing. A multilayer is made up of many, say 50 such physical periods, and is therefore a periodic array, but unlike a Langmuir-Blodgett multilayer of the prior art, it has two MML's in each basic period.

It will be observed, in the embodiment of FIG. 3 as well as in the other embodiments of the invention illustrated herein, that each group (basic period) contains a hydrocarbon molecular Langmuir-Blodgett layer and a monoatomic metal layer together with a multilayer structure which provides for the repeat periods of mixed spacing. The configuration of this multilayer structure differs in each embodiment of the invention to afford different operational features for the reflector.

The effective Bragg spacing or effective period thickness of the array constituting the multilayer is approximately the arithmetic mean of all spacing distances. Calling d the length of a hydrocarbon molecular pair with separating MML, the effective 2d spacing of the multilayer shown in FIG. 3 is given approximately by $\frac{3}{4}(2d_A) + \frac{1}{4}(2d_B)$, if $2d_A - 2d_B$ is small. Likewise, if $\lambda_A$ is the wavelength of peak normal incidence reflectivity of the multilayer shown in FIG. 1, and if $\lambda_B$ is the wavelength of peak normal incidence reflectivity of a similar multilayer made from Fatty Acid B, the wavelength of peak normal incidence reflectivity of the multilayer shown in FIG. 3 will be very nearly $\frac{3}{4}\lambda_A + \frac{1}{4}\lambda_B$, if $2d_A - 2d_B$ is small. Accordingly, by selecting the hydrocarbon materials of the hydrocarbon molecular Langmuir-Blodgett layers, normal incidence mirrors may be designed which can provide high reflectance at any desired wavelength. Since good performance is obtained from such a structure over a small but finite range of wavelengths, a finite number of molecular combinations can provide high reflectance over all wavelengths in the 70 Å–160 Å range. The minimum and maximum wavelengths are determined by the minimum and maximum chain lengths usable in the Langmuir-Blodgett process.

In essence it is the use of multilayer physical repeat periods containing more than one Langmuir-Blodgett bilayer which permits the design of mirrors that are reflective at any particular wavelength desired. It will be appreciated that the physical repeat periods may contain more than two species of hydrocarbon molecules and that more than two bilayer-MML structures may be used in each physical repeat period.

The following materials may for example be used to provide the Langmuir-Blodgett molecular hydrocarbon layers, either as Fatty Acid A or B, in the embodiments of the invention shown in FIG. 3 as well as in the other embodiments which will be described below in connection with FIGS. 4, 5 and 6: Myristic, Stearic, Eicosanoic, Docosanoic, Lignoceric and Mellissic acids.

A broadening of the band over which the films are reflective of normal incidence x-ray radiation may be accomplished by means of the multilayer structure shown in FIG. 4. The basic periods 11, 13, 15, 17 and 19 of each of several groups 21, 23, 25, 27 and 29 of periods of different spacing is illustrated in FIG. 4. Each of these periods is made up of a different combination of two species of hydrocarbon molecular Langmuir-Blodgett layers. These molecular layers are shown as being made from two species of fatty acid (Fatty-Acid A and Fatty-Acid B). The combination or ratio of layers of the different species in each basic period is different. Each combination has a different period length, and has peak reflectivity at a different wavelength. The reflectivities of each period are different such that the film is reflective over a band of wavelengths.

Figure 5:
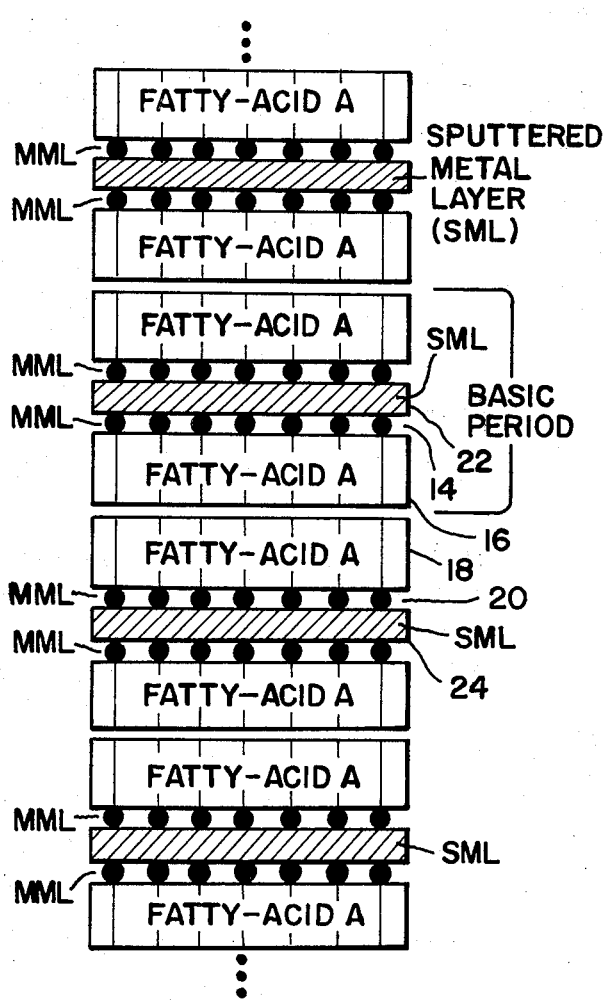
FIG. 5 is a schematic diagram of an x-ray mirror which has been designed to have an enhanced reflectance at some selected x-ray wavelength and which is provided in accordance with the second embodiment of the invention.

In FIG. 5 there is shown another multilayer which can serve as a normal incidence x-ray mirror. This multilayer used hydrocarbon molecular Langmuir-Blodgett layers of the same molecular species (this is labeled "Fatty Acid C" and may be one of the types of fatty acid mentioned above). In producing each multilayer structure an additional thin metallic layer, preferably of lead, or other heavy metal, is deposited on the monoatomic metallic layers. This may be accomplished by first depositing on a substrate, a pair of monoatomic metallic layers separated by a Langmuir-Blodgett hydrocarbon layer pair. For example, although the substrate is not shown in FIG. 5, it lies beneath an MML (like the MML labeled 20). The first pair of Langmuir-Blodgett depositions deposit an MML like 20, fatty-acid molecular layers like 18 and 16, and an MML like 14. The MML's in FIG. 5, labeled 14 and 20, have half the density of those in the preceding FIGS., because the thin metallic layer (SML) is deposited between single MML depositions. The substrate is then placed in an evaporator or sputtering apparatus and the sputtered or evaporated layer (SML) 22 is deposited. Then the structure is dipped into the tank containing the fatty acid and metal ion suspension and additional fatty acid layers and MML's are deposited. By additional steps of evaporation or sputtering and additional dipping, the film is built up to have the desired number of periods.

It will be noted that in the multilayer shown in FIG. 5 as well as in the multilayer shown in FIG. 3 the spacing between adjacent pairs of high density layers in the array is variable by design. By producing a periodic array with selected spacing, a multilayer which has peak reflectivity at a selected wavelength is obtained.

The wavelength at which the multilayer has its peak reflectivity will be at about double the separation between the centers of adjacent MML-SML-MML groups. As discussed above, the interaction with the x-rays of a basic period like that of FIG. 1 is excessively weak. The addition of the SML (and the use of a fatty acid with a shorter chain length to preserve resonance with the x-rays) brings the interaction to near its optimal value, increasing the reflectivity.

Figure 6:
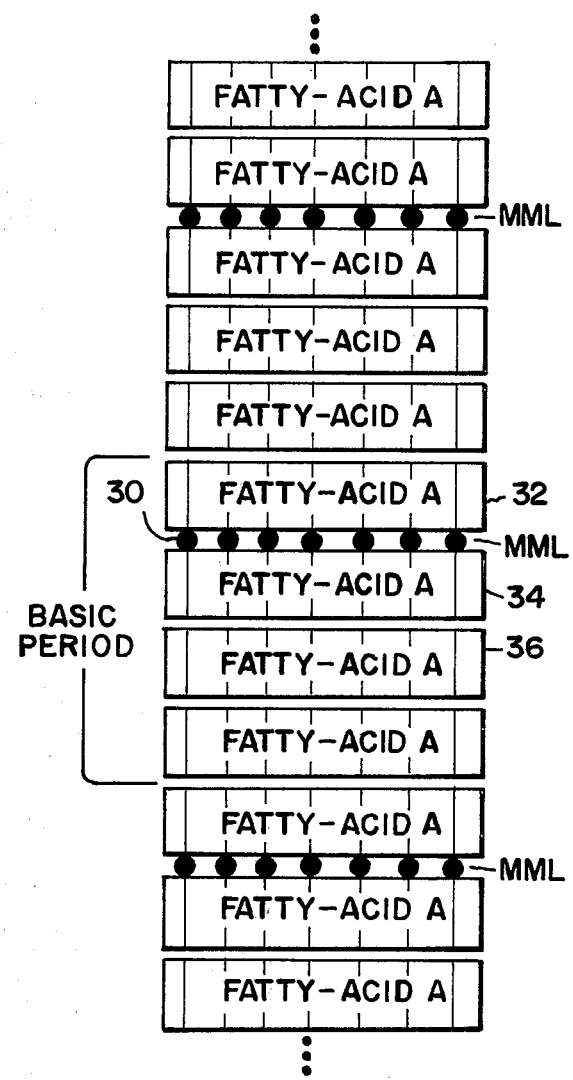
FIG. 6 is a schematic diagram of an x-ray mirror in accordance with another embodiment of the invention, the mirror being provided with additional Langmuir-Blodgett hydrocarbon molecular layers in order to be highly reflective of long wavelength soft x-rays.

Referring to FIG. 6 there is shown another multilayer having in each period, a central MML 30, two layers 32 and 34 and a bilayer 36. The layers 32 and 34 and the bilayer 36 contain fatty acid molecules of the same species. The molecule chains in the layer 34 and in the bilayer 36 are directly joined. The total length of the period is increased in accordance with the wavelength to be reflected, by providing in the mirror the additional bilayer 36. Each bilayer may be made of the same fatty acid species as illustrated, or of different fatty acids in accordance with a previously described provision of the invention (FIG. 3). While one additional bilayer is illustrated, it will be appreciated that more than one additional bilayer may be used, depending upon the wavelength which is to be reflected by the multilayer. Langmuir-Blodgett multilayers of the prior art are limited in their operation to wavelengths shorter than about 160 Å due to the limited range of depositable molecular chain lengths. Multilayers of the type shown in FIG. 6 can be designed to reflect wavelengths in the range 160 Å–300 Å. Wavelengths greater than 300 Å may also be reflected with this type of reflector, but inasmuch as metallic reflectors operate in a reasonably satisfactory manner at wavelengths above about 300 Å; it is unnecessary to resort to multilayers as provided by the invention to reflect radiation in this part of the spectrum.

Figure 7:
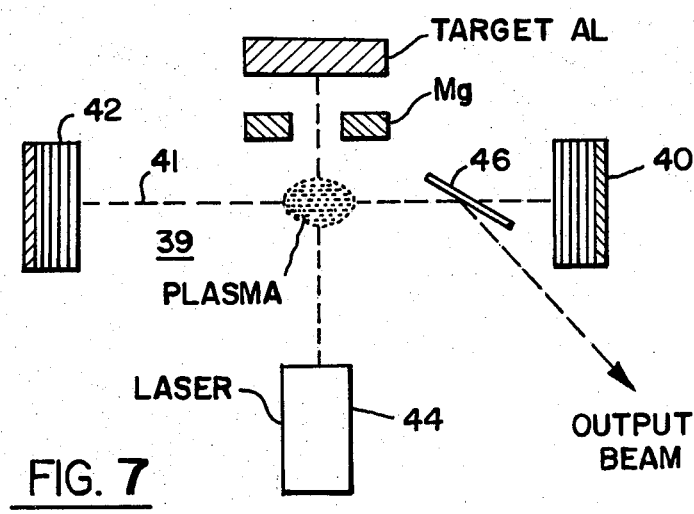
FIG. 7 is a schematic diagram of a resonator according to the invention.

FIG. 7 illustrates a resonant cavity 39 formed by multilayers 40 and 42. These multilayers have their surfaces normal to the axis 41 of the cavity and the opposed surfaces facing each other. The x-rays are generated by a plasma due to interaction by the beam of an optical laser 44 with a target which may be a body of aluminum. Aluminum provides x-ray lines in the vicinity of 130 Å. This wavelength is the wavelength which can be reflected with high peak reflectivity by virtue of the design of the multilayers 40 and 42 in accordance with the invention. The x-ray emitting plasma source is of a design described in the above-referenced article by Bhagavatula, et al. The x-rays in the cavity are outputted by a partially reflective device which may be a thin, free standing foil 46 or multilayer disposed at a high angle of incidence with the axis 41 of the cavity defined by the mirrors 40 and 42. A plasma may provide an active laser medium which amplifies x-rays due to the population inversion therein. These x-rays are amplified in the cavity as they are reflected back and forth between the multilayer mirrors 40 and 42. A portion of the amplified x-rays is reflected by the device 46 as the output beam.

From the foregoing description it will be apparent that there has been provided improved x-ray reflectors or mirrors as well as resonators utilizing the same. Variations and modifications in the herein described mirrors, reflectors and apparatus as well as other applications for the reflectors, within the scope of the invention, will undoubtedly suggest themselves to those skilled in the art. Accordingly, the foregoing description should be taken as illustrative and not in a limiting sense.

We claim:

1. An x-ray reflector adapted to reflect x-rays having normal incidence to the surface thereof which comprises an array of layers arranged in successive groups, each of said groups including a plurality of layers, each said group of said array having at least one metal layer of monoatomic thickness in a direction normal to said surface, a first hydrocarbon molecular Langmuir-Blodgett layer having a first chain length, and a structure having at least one additional layer, selected from metal and hydrocarbon Langmuir-Blodgett layers, having a length in said direction different from said first chain length.

2. The invention as set forth in claim 1 wherein the layers and structure in each group have a length in a direction normal to said surface such that the arithmetic mean of the spacing in said direction between successive metal layers is near one-half the wavelength of the x-rays to be reflected.

3. The invention as set forth in claim 1 wherein said structure is a Langmuir-Blodgett hydrocarbon molecular layer of chain length different from the chain length of said first Langmuir-Blodgett layer, and second monoatomic metallic and hydrocarbon molecular Langmuir-Blodgett layers.

4. The invention as set forth in claim 1 wherein each of said groups has a plurality of said monoatomic metallic layers, said structure being of length such that at least some of said monoatomic metallic layers which are adjacent to each other in said array have different spacing there between.

5. The invention as set forth in claim 1 wherein said structures in each of a plurality of said groups differ from each other, by being of different lengths which provide spacing between the monoatomic metallic layers in each of said plurality of groups having an arithmetic mean near one-half of one of a plurality of wavelengths in a band of wavelengths to be reflected.

6. The invention as set forth in claim 5 wherein each of said groups within said plurality of groups is a periodic repetition of another therein.

7. The invention as set forth in claim 6 wherein each of said groups in said plurality of periodically repetitive groups includes a plurality of multilayers each having at least one of said monoatomic metal layers between hydrocarbon molecular Langmuir-Blodgett layers, each of said plurality of multilayers having a different combination of hydrocarbon molecules of different chain length.

8. The invention as set forth in claim 1 wherein said structure is a multilayer structure, a second Langmuir-Blodgett hydrocarbon molecular layer and a second monoatomic metal layer between a third and a fourth Langmuir-Blodgett hydrocarbon molecular layer, said third layer being a chain length different from said fourth layer.

9. The invention as set forth in claim 8 wherein one of said third and fourth layers is of the same chain length as said first Langmuir-Blodgett layer.

10. The invention as set forth in claim 1 wherein said structure in each of said groups is a metal film, a second monoatomic metal layer, the first named monoatomic metal layer and said second monoatomic metal layer being disposed on opposite sides of said film, and a second hydrocarbon molecular Langmuir-Blodgett layer, the first named Langmuir-Blodgett layer and said second Langmuir-Blodgett layer being disposed on opposite sides of said metal film adjacent to different ones of said first and second monoatomic metal layers.

11. The invention as set forth in claim 10 wherein each of said first and second Langmuir-Blodgett layers has like chain length.

12. The invention as set forth in claim 1 wherein said structure comprises a plurality of hydrocarbon molecular Langmuir-Blodgett layers which have directly joined hydrocarbon molecular chains.

13. The invention as set forth in claim 12 wherein said plurality of directly joined Langmuir-Blodgett layers each contains a second Langmuir-Blodgett layer and a bilayer having a pair of molecular chains, said bilayer being adjacent to said second Langmuir-Blodgett layer, said second Langmuir-Blodgett layer being disposed between said first named monoautomic metal layer and said bilayer.

14. The invention as set forth in claim 1 wherein said structure is a layer of metal of thickness greater than the thickness of said monoatomic metallic layer in said direction normal to said surface, and second monoatomic metallic and hydrocarbon molecular Langmuir-Blodgett layers.

15. A resonant cavity for supporting laser action comprising a pair of mirrors each being a multilayer having a Langmuir-Blodgett hydrocarbon layer, a monoatomic metal layer, and a structure including at least an additional layer, selected from metal and Langmuir-Blodgett hydrocarbon layers, stacked in an array of Bragg spacing nearly equal to one-half the x-ray wavelength at which said cavity is resonant, said multilayers being disposed with the surfaces thereof normal to a common axis and spaced from each other.

16. The invention as set forth in claim 15 further comprising means for generating a plasma in said cavity which emits and amplifies x-rays at said wavelength along said axis, and means for deriving said x-rays from said cavity.

17. The invention as set forth in claim 16 wherein said plasma generating means comprises a target and a laser which directs a beam of optical energy at said target.

* * * * *